United States Patent [19]
Patton

[11] Patent Number: 5,708,739
[45] Date of Patent: Jan. 13, 1998

[54] METHOD AND APPARATUS FOR PHOTOBLEACHING PATTERNS IN IRRADIATED OPTICAL WAVEGUIDES

[75] Inventor: Scott L. Patton, Westerly, R.I.

[73] Assignee: The United States of America as represented by the Secretary of the Navy, Washington, D.C.

[21] Appl. No.: 708,422

[22] Filed: Sep. 9, 1996

[51] Int. Cl.⁶ .................................................. G02B 6/34
[52] U.S. Cl. ............................. 385/37; 359/569; 359/900
[58] Field of Search ........................... 385/10, 37, 124, 385/129; 430/290, 321, 339; 359/569, 571, 572, 573, 563, 34, 130, 900

[56] References Cited

U.S. PATENT DOCUMENTS

| | | | |
|---|---|---|---|
| 3,916,182 | 10/1975 | Dabby et al. | 359/173 |
| 4,182,664 | 1/1980 | Maklad et al. | 64/425 |
| 4,400,056 | 8/1983 | Cielo | 385/27 |
| 4,403,031 | 9/1983 | Borrelli et al. | 430/332 |
| 4,636,031 | 1/1987 | Schamdel, Jr. et al. | 385/37 |
| 4,725,110 | 2/1988 | Glenn et al. | 385/100 |
| 4,776,661 | 10/1988 | Handa | 385/37 |
| 4,793,680 | 12/1988 | Byron | 385/37 |
| 5,042,897 | 8/1991 | Meltz et al. | 385/37 |
| 5,061,032 | 10/1991 | Meltz et al. | 385/37 |
| 5,066,133 | 11/1991 | Brienza | 385/37 |
| 5,104,209 | 4/1992 | Hill et al. | 385/37 |

*Primary Examiner*—Rodney B. Bovernick
*Assistant Examiner*—Hemang Sanghavi
*Attorney, Agent, or Firm*—Michael J. McGowan; Prithvi C. Lall; Michael F. Oglo

[57] ABSTRACT

A method and apparatus for photobleaching predetermined patterns in an optical waveguide. The apparatus irradiates the optical waveguide generally held in a fixture. The irradiation includes a selected region or regions of the optical waveguide or the entire optical waveguide. The radiation interacts with radiation sensitive constituents in the optical waveguide to induce a light transmission loss. After the irradiation is completed, the optical waveguide is allowed to age whereby the light transmission recovers to an equilibrium less value. Light beams photobleach predetermined patterns into the previously irradiated region or regions. The patterns may take the form of Bragg gratings in the waveguide.

29 Claims, 3 Drawing Sheets

METHOD AND APPARATUS FOR PHOTOBLEACHING PATTERNS IN IRRADIATED OPTICAL WAVEGUIDES

STATEMENT OF GOVERNMENT INTEREST

The invention described herein may be manufactured and used by or for the Government of the United States of America for governmental purposes without the payment of any royalties thereon or therefor.

CROSS REFERENCES TO RELATED PATENT APPLICATIONS

This instant application is related to two co-pending U.S. Patent Applications entitled METHOD AND APPARATUS FOR IRRADIATING PATTERNS IN OPTICAL WAVEGUIDES CONTAINING RADIATION SENSITIVE CONSTITUENTS (U.S. Case No. 08/709,624); and FIBER OPTIC HANDLING AND COATING FIXTURE (U.S. Case No. 08/708,423) having same filing date.

BACKGROUND OF THE INVENTION

(1) Field of the Invention

This invention relates generally to a method and apparatus for processing optical waveguides and more particularly to a method and apparatus for photobleaching patterns in such optical waveguides.

(2) Description of the Prior Art

Optical waveguides, including planar waveguides, fiber and fiber-like substrates such as fiber optic cable, are known. These waveguides may comprise a central, light transmissive, cylindrical or semi-cylindrical glass core surrounded by a light reflecting or refracting transmissive glass cladding. Such waveguides may include additional rings, semi-rings or layers of fusible glass or other refractive, reflective or protective materials.

A planar waveguide may incorporate all of the above attributes and may comprise additional attributes. They are normally formed in flat sheet(s) of glass or other known optical radiation transmissive materials. These waveguides may also be formed on non-flat sheet(s) of materials or on the surface of non-optically transmissive materials. The form of these waveguides are known to be substantially different from that commonly found in the optical fibers. Various methods for forming these planar waveguides are known including chemical vapor deposition, sputtering, electron beam or ion beam implantation. These methods or combinations of methods allow much more complex patterns to be formed in a much more compact manner than are possible with optical fiber type waveguides.

It is also known to change the useful properties or characteristics of selected areas of such waveguides. For example, the following United States Letters Patent disclose waveguides with altered light transmission characteristics and methods for making such alterations:

U.S. Pat. No. 3,916,182 (1975) Dabby et al.
U.S. Pat. No. 4,182,664 (1980) Maklad et al.
U.S. Pat. No. 4,400,056 (1983) Cielo
U.S. Pat. No. 4,403,031 (1983) Borrelli et al.
U.S. Pat. No. 4,636,031 (1987) Schmadel, Jr. et al.
U.S. Pat. No. 4,776,661 (1988) Handa
U.S. Pat. No. 4,725,110 (1988) Glenn et al.
U.S. Pat. No. 4,793,680 (1988) Byron
U.S. Pat. No. 5,042,897 (1991) Meltz et al.
U.S. Pat. No. 5,061,032 (1991) Melt et al.
U.S. Pat. No. 5,066,133 (1991) Brienza
U.S. Pat. No. 5,104,209 (1992) Hill et al.

The Dabby et al. patent discloses an optical waveguide comprising either a substrate coated with a layer of optic material or a clad optic fiber. A periodic variation in the index of refraction of either the substrate and/or the optical layer, the core and/or cladding of the optic fiber is introduced so that unwanted frequency components present in the optical signal passing through the waveguide are eliminated. The waveguide may be employed as a band-pass or a band-stop filter or for phase-matching purposes. Various means are disclosed for altering the periodicity of the index of refraction to thereby tune the device.

In the Maklad et al. patent optical fibers of silica and plastic composition are rendered relatively stable to nuclear radiation induced optical losses by preirradiating with a high initial radiation dose. Subsequent exposure of the radiation hardened fibers produce substantially lower radiation induced optical loss and faster fiber transmission recovery rates.

The Cielo patent discloses a tunable optical fiber reflector together with a method of making such a reflector. A length of optical fiber has a core of a first light transmitting material, and a cladding of a second light transmitting material covering the core. The cladding is etched away to a predetermined thickness over a portion of the fiber. A layer of photoresist material is applied either to the etched portion of the fiber or to a thin metal blade, i.e., a mask, and then exposed to beams of light which optically interfere and generate a standing wave pattern in said material. The photoresist material is then developed to fix the wave pattern in the material. An optical discontinuity is formed in one of the core and cladding by that fixed wave pattern when the photoresist is on the etched section or when the developed mask is used to expose the core and cladding. This discontinuity represents a quasi-periodical fluctuation in the refractive index and causes evanescent waves in the cladding to be reflected. Such a discontinuity forms a distributed-feedback reflector.

In accordance with the Borrelli et al. patent optical patterns formed by localized optical density or refractive index variations in glass are produced by impregnating a porous glass support with a photolyzable organometallic compound and selectively exposing the glass to a photolyzing light source to cause the photolytic decomposition of the organometallic compound in exposed portions of the glass. The patterns are fixed, if desired, by removing unreacted organometallic compound from the pores.

The Schmadel, Jr. et al. patent discloses a tuned optical fiber grating and a tuning process. The gratings on the optical fiber are tuned so that the reflectance of the grating can occur at a specific wavelength. The process involves encasing that portion of the fiber containing the grating while shining light of the wavelength of desired reflectance through the fiber and stretching the grating until reflectance occurs. Thereafter, the tuned grating is sealed within a tube formed around the tuned grating.

An integrated optical device shown in the Handa patent performs optical data processing in an integrated arrangement using an optical waveguide. The waveguide comprises a substrate, a slab optical waveguide provided on the substrate, a channel optical waveguide provided at a portion of the slab optical waveguide, and a grating coupler provided with a grating structure at a portion of the channel optical waveguide to optically couple the slab optical waveguide and the channel optical waveguide.

In the Glenn et al. patent a dielectric periodic index of refraction phase grating is established upon the core of an optical waveguide by an intense angled application of several transverse beams of ultraviolet light. This enables the establishment of a distributed, spatially resolving optical fiber strain gauge.

The Byron patent discloses the use of a pulsed high-power laser beam incident on the surfaces of a wide variety of materials to produce ripples on such surfaces. These ripples result from an interference between scattered waves and an incident beam producing intensity fringes, and hence localized heating. The dimensions of the ripples are dependent on the wavelength of the incident light. Hence a grating whose length is a few hundreds of micrometers is produced. If the cladding is removed this effect of ripple generation is enhanced.

Optical waveguides disclosed in the Meltz et al. patents incorporate Bragg diffraction gratings. In both patents the grating element is formed in the core or the waveguide by exposing the core or waveguide to an interference pattern of two ultraviolet radiation beams that are symmetrical with respect to a plane extending at the oblique angle relative to the core or waveguide axis.

Apparatus for forming an extended length of Bragg gratings in an optical waveguide, as disclosed in the Brienza patent, includes a source that directs a coherent light beam of a frequency in the ultraviolet range in a primary path transversely toward the waveguide. A section of a diffraction grating extends through the primary path at a spacing from the waveguide, and the diffraction grating has a dimension normal to the primary path. Relative movement is effectuated between the waveguide and diffraction grating in unison and the primary path. Consequently, the light beam diffracts at the diffraction grating into two mutually frequency-shifted partial light beams propagating in diverging secondary paths. The partial light beams are caused to travel toward a shared location of the waveguide where they form an interference pattern that moves longitudinally of the waveguide but respective high intensity fringes of which extend through the waveguide at respective positions that are stationary relative to the waveguide to effect refractive index changes at such positions along an extended length of the waveguide.

The Hill et al. patent discloses a method of creating a grating in an optical fiber. This method comprises disposing a slit mask containing one or more slits over a side of an optical fiber and illuminating the fiber through the slit mask by substantially monochromatic ultraviolet light for a short internal, whereby an index grating line is created and stored in the core of the fiber.

The Dabby et al., Maklad et al., Cielo, Borrelli et al., Schmadel et al. and Handa patents alter characteristics by photolithographic, mechanical, chemical and other related processes. The Glenn, Byron, Meltz et al., Brienza and Hill et al. patents disclose generally the formation of a Bragg grating by irradiating an optical waveguide with light in particular bandwidths. Light in the green and ultraviolet spectra are particularly used normally with germania- or alumni-doped optical waveguides.

Bragg gratings established by such methods are of limited use, as such gratings only refract light frequencies in limited frequency bands. These bands generally constitute only a portion of spectra used in most applications. Further, these methods produce gratings with germania doped fibers and normally along the entire length of the core fiber only.

Moreover, the processes disclosed by these references require both doped fibers reactive to ultraviolet light and lasers for generating ultraviolet light. Non-predictable variations in the level of photobleaching can occur particularly at boundaries between areas of normal light transmission. When this occurs, the refraction near the selected frequency can vary across a boundary area. Such variations can require tuning as described in the Schmadel et al. patent. These variations limit the usefulness of the fiber. Moreover, controls to limit such variations increase processing complexity and cost.

The references fail to teach a method and apparatus for forming patterns and particularly Bragg gratings in optical waveguides to refract light of a selected frequency at one or more predetermined cable locations. The references also fail to disclose a relatively simple procedure and apparatus for forming patterns that can be formed for refracting desired frequencies of light. Additionally, these references fail to provide a method and apparatus for forming patterns in a plurality of segments of a single or plurality of waveguides in a relatively simple and efficient manner. Finally, the references fail to teach or suggest apparatus and a method for forming Bragg gratings in optical waveguides formed of a wide variety of materials usable for producing optical waveguides.

SUMMARY OF THE INVENTION

An object of the present invention is to provide a method and apparatus to establish predetermined patterns in an optical waveguide.

Another object of the present invention is to provide a method and apparatus to establish Bragg gratings at a predetermined location in an optical waveguide.

A further object of the present invention is to provide a method and apparatus to form Bragg gratings at one or more predetermined locations in an optical waveguide.

A still further object of the present invention is to provide a relatively simple and effective method and apparatus for establishing a Bragg grating in an optical waveguide that is tuned to reflect or refract selected light in a specific frequency band.

According to one aspect of the present invention there is provided a method for establishing Bragg gratings or other predetermined patterns in an optical waveguide. A nuclear radiation source irradiates a selected region of or the entirety of the optical waveguide to effect a change in light transmission. Subsequent aging allows the light transmissivity to reach a state of substantial equilibrium. Introducing a light interference pattern or light patterned with a mask into the optical waveguide photobleaches the optical waveguide and establishes a Bragg grating or other predetermined pattern wherever the interference or mask pattern interacts with a previously irradiated region of the waveguide.

According to a another aspect of the invention an apparatus for establishing a Bragg grating or other predetermined pattern in an optical waveguide comprises a nuclear radiation source for generating a stream of nuclear radiation over a selected region of or the entirety of the optical waveguide held proximate the source by a positioning fixture. The irradiation induces a change in the light transmissivity of the optical waveguide. Subsequent aging enables the light transmissivity to return to substantial equilibrium. A light source generates an interference pattern or is passed through a mask to create a pattern that photobleaches a Bragg grating or other predetermined pattern in the optical waveguide wherever the light interacts with a previously irradiated region.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
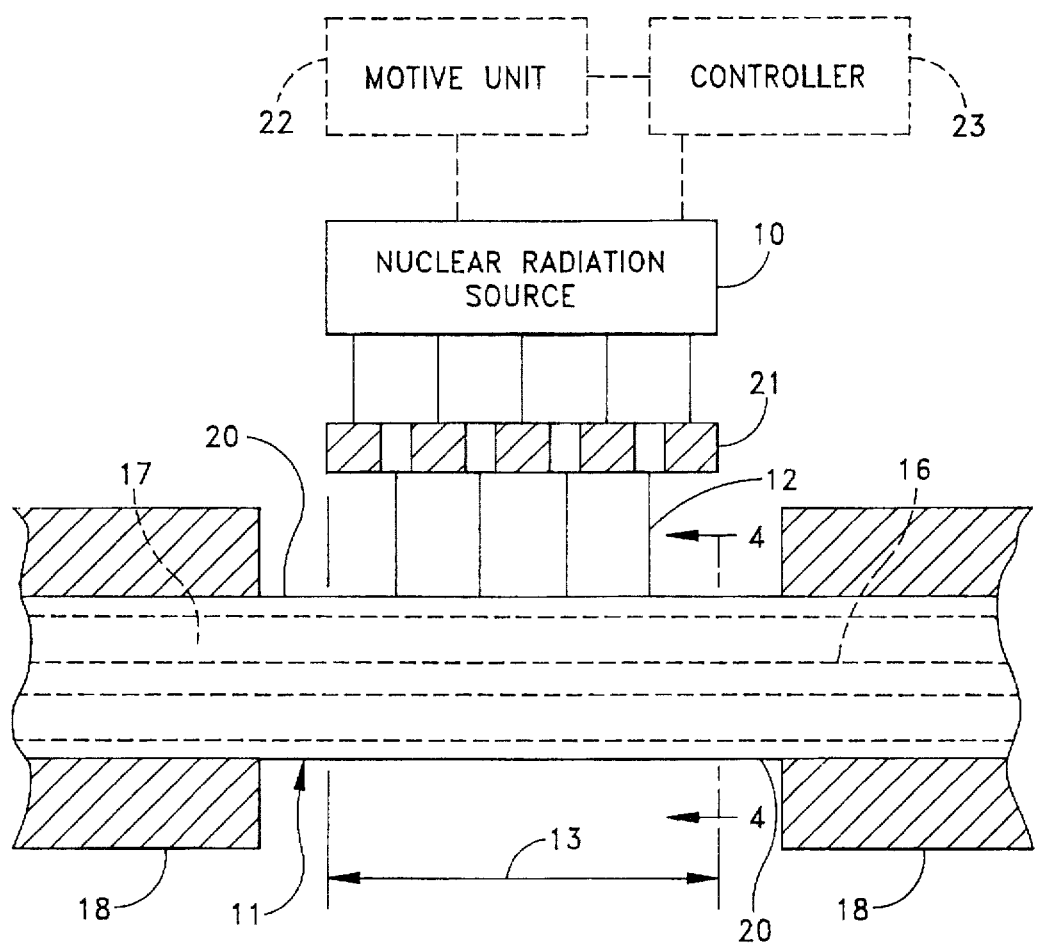
FIG. 1 is a partially diagrammatic, partially side elevational and cross-section view for understanding certain steps of a process for forming a Bragg grating or other predetermined pattern in an optical waveguide according to the present invention.

FIGS. 1, 2, 3 and 5 depict apparatus for forming predetermined patterns in the transmission paths of optical waveguides according to one embodiment of the process of this invention. In FIG. 1 a radiation source 10 irradiates an optical waveguide 11 with nuclear radiation. The radiation stream represented by lines 12 irradiates either one or more selected regions 13 of the optical waveguide 11, or the entirety of the optical waveguide 11. The optical waveguide includes a radiation sensitive constituent that is determinative of light transmissivity through the optical waveguide 11. Irradiating the optical waveguide 11 alters this constituent and induces a loss in the transmissivity of the optical waveguide. When the optical waveguide 11 is isolated from the radiation source 10, the transmissivity through the optical waveguide 10 recovers to an equilibrium value. The irradiated regions then are susceptible to photobleaching by a light source generating an interference pattern or by passing light from a light source through a mask to create a pattern.

Figure 2:
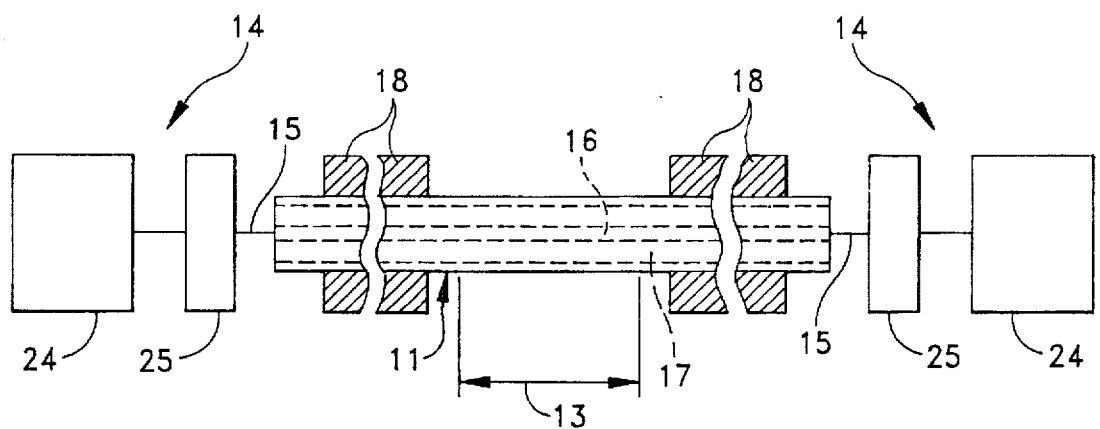
FIG. 2 is a view that is useful in understanding other steps of this process.

The apparatus in FIG. 2 includes an optical assembly 14 that enables a counter propagation of light beams 15 along an optical path or axis of the optical waveguide 11 that includes any irradiated region 13. The Counter propagated light beams 15 generate an interference pattern that photobleaches the irradiated regions 13 to form Bragg gratings in these regions.

Figure 3:
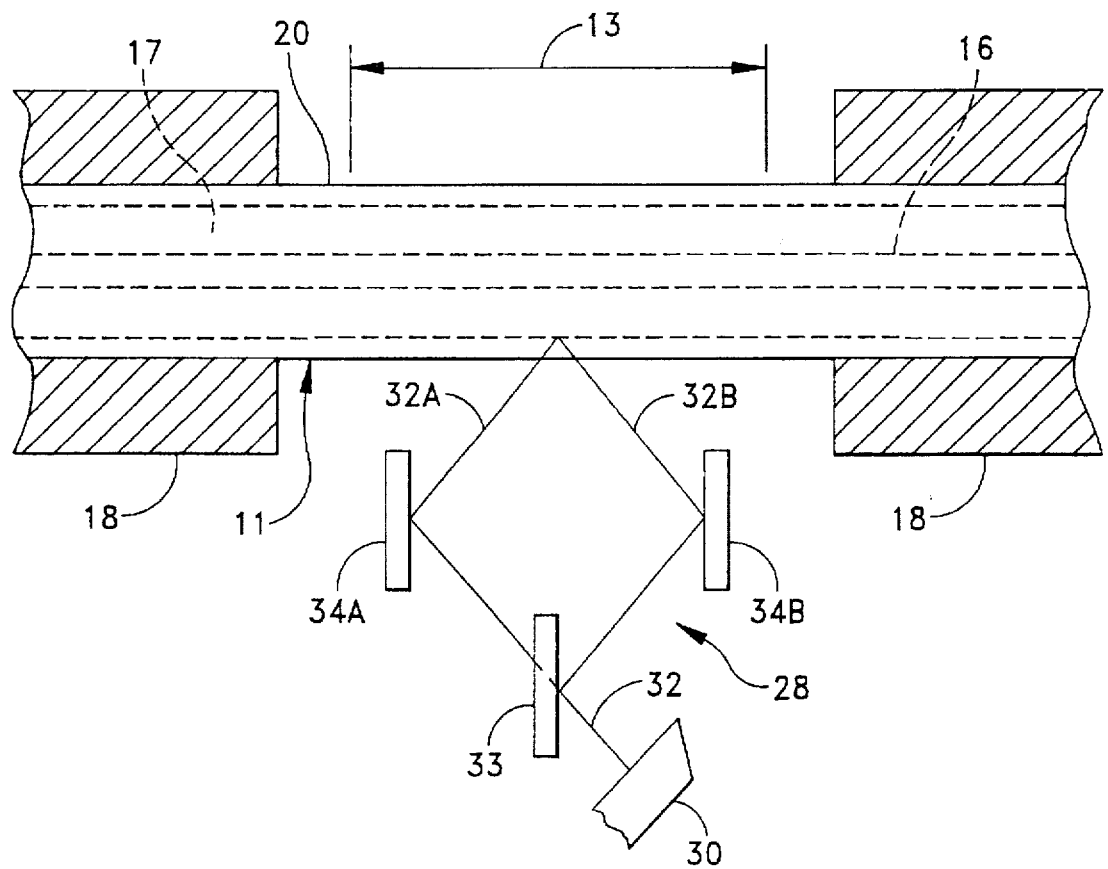
FIG. 3 is a view that is useful in understanding steps that can be substituted for the steps depicted in FIG. 2.

FIG. 3 depicts an apparatus for producing a transversely directed split light beam interference pattern for forming a Bragg grating in a region 13 of the optical waveguide 11. The use of an externally generated pattern limited to a particular region 13 limits the formation of the Bragg grating to the region 13 even though the entire optical waveguide 11 may have been irradiated.

Figure 4:
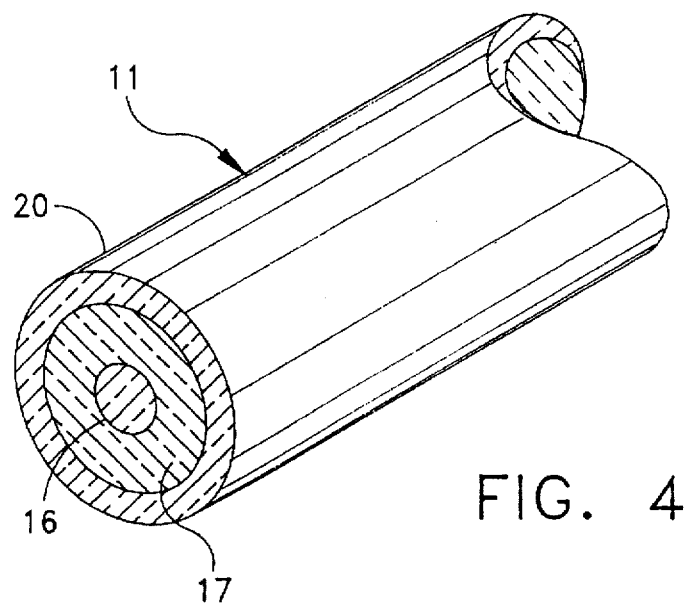
FIG. 4 is a perspective cross-sectional view of the fiber optic cable of FIG. 1 taken along the section line 4—4.

FIG. 4 depicts a portion of a typical three-glass optical waveguide 11 that comprises an inner transmission path or core 16 surrounded by reflective or refractive cladding 17. An outer fusible layer coating 20 overlies the reflective or refractive cladding 17. A two-glass fiber omits the fusible layer 20. That is, a two-glass optical waveguide comprises the central core 16 and reflective or refractive cladding 17. Either optical waveguide may, as known, be sheathed by a protective material although no such sheathing is shown. In some procedures, particularly using the apparatus in FIG. 3, it will be desirable to remove any such sheathing from any regions to be exposed to the interference pattern. Typically the central core will include a constituent that is radiation sensitive such as silicon or a dopant of germania, europium or alumina. As will become apparent, this invention will also provide the desired features if the constituent is located in the reflective or refractive cladding 17 of FIG. 4, rather than the core 16.

Figure 5:
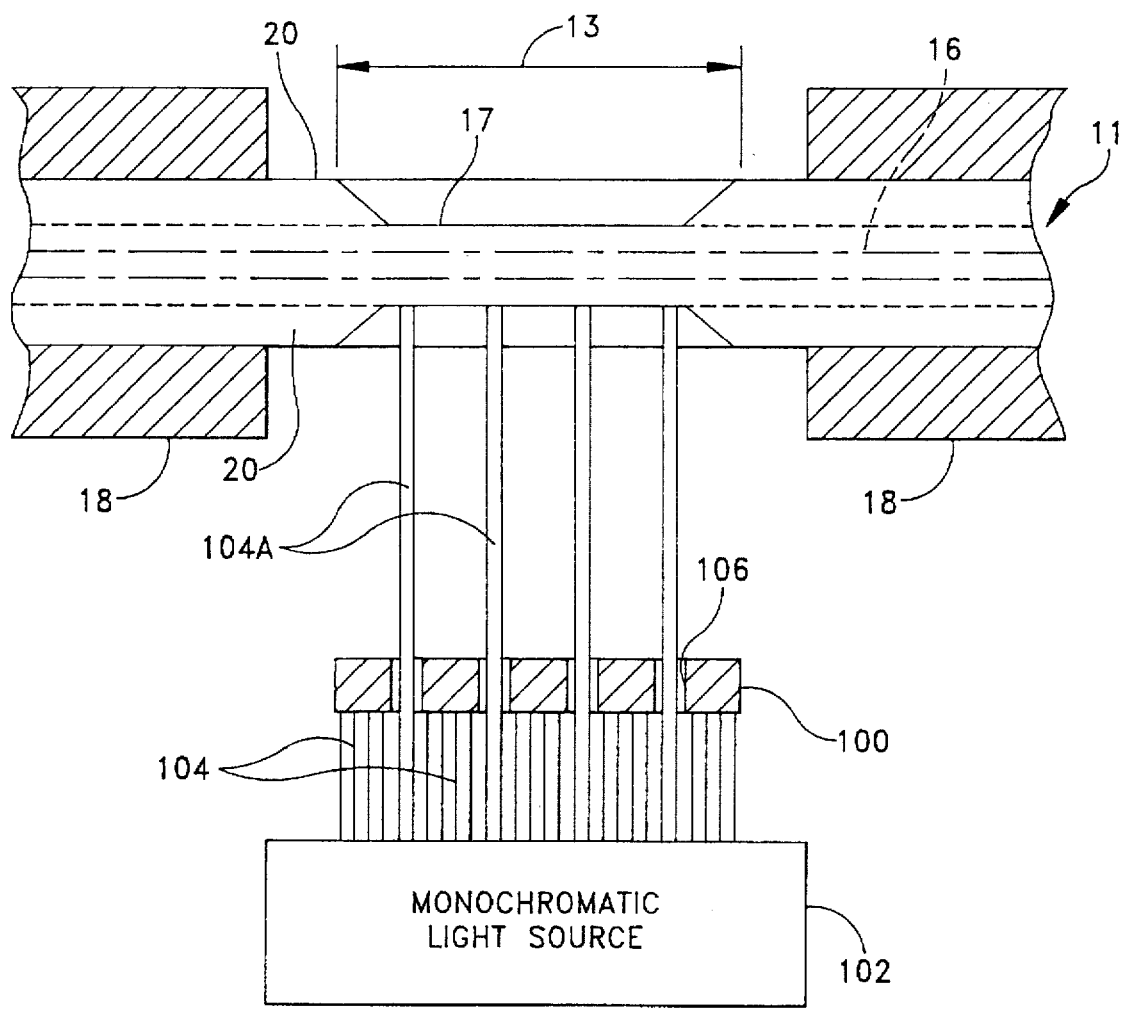
FIG. 5 is a view that is useful in understanding further steps that can be substituted for the steps depicted in FIGS. 2 and 3.

The apparatus in FIG. 5 includes a mask 100 that allows passage of monochromatic light from a source only in a predetermined pattern, the light forming the predetermined pattern in a region 13 of the optical waveguide 11. The mask 100 limits the formation of the predetermined pattern to a particular region 13 even though the entire optical waveguide may have been irradiated.

Referring again to FIG. 1, as an initial step in the process the radiation source 10 directs the radiation stream 12 onto a selected region 13 of the optical fiber 11. The radiation source 10 preferably is a gamma source but may also be a beta, neutron or X-ray source. Irradiation of the region 13 acts upon any dopant or other constituents in the core 16 and reflective or refractive layer 17. This irradiation thereby changes the refractive index of the region, causes an almost negligible reduction in the volume of the region 13, and produces a loss in the light transmission capacity over the irradiated section 13. In this specific example, a fixture 18 supports the selected portion 13 in the radiation stream 12. Such a support may comprise a fixture 18 of the type disclosed and described in patent application titled Fiber Optical Handling and Coating Fixture (Navy Case No. 74931) which is commonly assigned with the present application and incorporated by reference herein. This fixture allows spaced regions, like the region 13, to be irradiated simultaneously. Such spaced regions could also be formed by irradiating the regions individually in sequence. It is also possible to irradiate the entire optical waveguide 11.

FIG. 1 also depicts, in phantom, components of the radiation source 10 that controls the irradiation step. For example, in FIG. 1, a mask 21 may be used to pattern the radiation 12 by directing radiation only onto the selected regions 13. That is, the mask 21 could limit the length of the region 13 or other regions being irradiated simultaneously. A motive unit 22 could move the source 10 or direct its radiation output for controlling the intensity of the radiation and the region, or scanning discrete regions with radiation or both. An example of such a directable radiation source is a scanning electron beam microscope. The intensity of the radiation source 10, the type of the radiation and the loss needed to create the sufficient light transmission loss in the region 13 determines the time necessary for the irradiation and may be controlled by a controller unit 23, such as a programmable microprocessor. For example, irradiating an 11% mole weight germania doped core with a $Co^{60}$ gamma radiation source induces a 2 db loss per kilometer of cable after an exposure of $10^6$ rads.

After radiation, the optical waveguide 11 ages. More specifically, left alone over time, the loss in light transmissivity decreases. After some interval the change in loss with time becomes negligible. Thus, after aging, the induced loss of transmissivity to the irradiation reaches an equilibrium. Typically this will require about 24 hours. Whatever the time selected, however, some aging will occur between the irradiation step and subsequent photobleaching step.

There are several alternatives available for performing the photobleaching step. Referring again to FIG. 2 there is depicted a process whereby the optical assembly 14 counter propagates the light beams 15 through the waveguide 11. This optical assembly 14 includes coherent light sources 24, and optical systems 25 that collimate, polarize, and direct the light beams 15 into opposite ends of the optical waveguide 11.

As known, the counter propagation of coherent, polarized, collimated light beams 15 through the optical waveguide 11 generates an interference pattern in the optical waveguide 11 corresponding to the frequency of the light beams. This interference pattern appears along the length of the optical waveguide 11 and photobleaches a Bragg grating into any previously irradiated region, such as region 13.

More specifically, assume that the core 16 contains the radiation sensitive constituent and the irradiation was limited to a single region 13. If the optical assembly 14 directs the light beams 15 through the core 16, the resulting interference pattern will exist throughout the core 16, but will photobleach Bragg grating elements only in the region 13. If, however, the optical system 14 directs the light beams through the reflective or refractive cladding 17, the resulting interference pattern will photobleach Bragg grating elements into the core 16, but only adjacent the interface between the core 16 and reflective or refractive cladding 17 and only in the region 13.

Assume that the reflective or refractive cladding 17 contains the radiation sensitive element and that the irradiation was limited to the region 13. If the optical assembly 14 directs the light beams 15 through the reflective cladding 17, the resulting interference pattern will photobleach Bragg grating elements into the reflective or refractive cladding 17, but only in the region 13. If, however, the optical system 14 directs the light beams through the core 16, the resulting interference pattern will photobleach Bragg grating elements into the reflective or refractive cladding 17 but only adjacent the interface with the core 16 and only in the region 13.

The counter propagating light beams shown in FIG. 2 produce an interference pattern having a fixed, sinusoidal wave shape. Optical apparatus 28 shown in FIG. 3 enables the light characteristics to be controlled thereby to control the form of the Bragg grating elements. A single light source 30 directs coherent light beams 32 through a beam splitter 33 that splits the light beam 32 from the source 30 into the beams 32A and 32B directed to mirrors 34A and 34B, respectively. Mirrors 34A and 34B direct the beams 32A and 32B onto the irradiated region 13. The beams 32A and 32B generate an interference pattern over the region 13.

As known, it is possible to control the characteristics of the interference pattern with the optical assembly 28 in FIG. 3. That is, appropriate apparatus can be added to the optical system 28 to shape the light wave, vary light intensity and vary light frequency. Varying these parameters individually or in combination allows control over the grating intensity, frequency and shape. In addition an optical mask 35 can be located intermediate the mirrors 34A and 34B and the optical waveguide 41 to limit the transfer of the interference pattern to and photobleaching of the optical waveguide 11 to the region 13. This optical assembly 28 then also allows the radiation source 10 in FIG. 1 to irradiate the entire optical waveguide 11. After aging, the optical system 28 in FIG. 3 can be used with the optical mask 35 to form Bragg grating elements in one or more selected regions like region 13 by limiting exposure to the interference pattern to these regions.

Notwithstanding the differences in the optical systems of FIGS. 2 and 3, there are common characteristics. In each the frequency of the light determines the distribution of the grating elements. This occurs independently of the specific radiation sensitive constituent. The exposure time for a particular frequency of light in a given optical waveguide material will vary according to the power of the light source and the desired transmission and reflective characteristics of the Bragg grating. The longer the exposure from a given light source the greater the reflectance of light of the selected frequency by the Bragg grating formed. Likewise, a light source of a lower output requires a longer exposure time to produce a comparable Bragg grating.

Referring again to FIG. 5, there is depicted a process whereby a predetermined pattern can be formed in irradiated region 13. Monochromatic light source 102 directs coherent light beam 104 to the mask 100. The mask 100 does not allow passage of the light beam 104 except in transparent regions 106. The transparent regions 106 are formed in the mask 100 in a predetermined pattern. Preferably, the transparent regions 106 are relatively large with respect to the wavelength of the light beam 104 so that the transparent regions 106 do not diffract the light beam 104 as it passes through mask 100 and thereby generate an interference pattern at the optical waveguide 11 in the area of patterned light beam 104A. The transparent regions 106 also tend to collimate the light beam 104 so that the patterned light beam 104A corresponds in shape and size to the transparent regions 106 with sharp demarcations corresponding to the edges of the transparent regions 106. The patterned light beam 104A continues to region 13, forming the predetermined pattern in waveguide 11 that also have corresponding sharp demarcations, shapes and sizes. The pattern may be such as to establish Bragg grating elements.

It is another benefit of this invention that using any frequency of light produces a predetermined pattern in most materials only in an irradiated region. However, green light and ultraviolet light frequencies may lead to formation of Bragg grating elements in germania doped optical waveguides outside the irradiated region when the apparatus and method depicted in FIG. 2 is employed. That will only occur using the optical assembly 28 of FIG. 3 or the mask 100 of FIG. 5 when beams 32A and 32B of FIG. 3 or beam 104A of FIG. 5 are directed at regions other than irradiated region 13.

Thus predetermined patterns or Bragg gratings that can reflect light of selected frequencies, are established by irradiating selected regions of or the entirety of an optical waveguide with nuclear radiation, aging the area, and then generating a predetermined pattern or an interference pattern using light corresponding .to a desired frequency in the irradiated regions to photobleach the pattern or Bragg grating elements. More specifically, the present invention is directed to both a method and apparatus for establishing predetermined patterns and Bragg gratings in a selected region or regions or the entirety of an optical waveguide. Nuclear radiation from a radiation source irradiates the selected region or regions or the entire optical waveguide by positioning the optical waveguide proximate the source and induces a loss of transmission capacity in the irradiated region. Aging the optical waveguide allows the light transmission capacity to recover to an equilibrium value. Establishing a predetermined pattern or a light interference pattern in the optical waveguide will photobleach each irradiated region and forms a predetermined pattern or Bragg grating therein. As described, this process can be applied to a single region or discrete regions of the optical waveguide or to the entire waveguide.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A method for establishing a predetermined pattern in an optical waveguide having a given light transmissivity partially dependent upon the presence of a radiation sensitive constituent in the optical waveguide and having an indeterminate length, said method comprising the steps of:
   irradiating the optical waveguide with nuclear radiation to effect a change in the constituent and produce a predetermined pattern of change in the light transmissivity of the optical waveguide therein;
   aging the optical waveguide to enable the light transmissivity to reach a state of substantial equilibrium; and
   producing in a selected portion of the optical waveguide a light pattern that photobleaches the predetermined pattern in the optical waveguide wherever the selected portion and the constituent are coextensive.

2. A method for establishing a predetermined pattern as recited in claim 1 wherein said irradiation step directs nuclear radiation at a plurality of discrete regions in the optical wave guide in successive steps.

3. A method for establishing predetermined pattern as recited in claim 1 wherein said irradiation step directs nuclear radiation at a plurality of discrete regions in the waveguide simultaneously.

4. A method for establishing a predetermined pattern as recited in claim 1 wherein:
   the predetermined pattern is a Bragg grating; and
   said light pattern production step includes directing coherent light through the optical waveguide from opposite ends thereof, said light pattern being an interference pattern and whereby the frequency of the light defines the Bragg grating characteristics.

5. A method for establishing a predetermined pattern as recited in claim 1 wherein:
   the predetermined pattern is a Bragg grating; and
   said light pattern production step includes directing split light beams externally of the waveguide and generally transversely to the length of the optical waveguide thereby to produce an interference pattern in the optical waveguide whereby the frequency of the Bragg grating corresponds to the frequency of the interference pattern.

6. A method for establishing a predetermined pattern as recited in claim 5 wherein said interference pattern production step additionally includes controlling the light in the split beams thereby to control the interference pattern and the form of the Bragg grating.

7. A method for establishing a predetermined pattern as recited in claim 1 wherein said light pattern production step includes directing coherent light through a mask, said mask having transparent portions and blocking portions, said transparent portions allowing passage of said coherent light and said blocking portions not allowing passage of said coherent light, said transparent portions corresponding to the predetermined pattern.

8. A method for establishing a predetermined pattern as recited in claim 1 wherein the optical waveguide comprises a central light transmissive core of one material and a refractive cladding of another material and wherein the constituent appears in one of the materials and the other is free of any such constituent, said irradiation step effecting only the material containing the constituent.

9. A method for establishing a predetermined pattern as recited in claim 8 wherein said light pattern production step photobleaches only irradiated portions of the material having the constituent.

10. A method for establishing a predetermined pattern as recited in claim 9 wherein the core material contains the constituent material and wherein said light production step produces a predetermined pattern in the central light transmissive core.

11. A method for establishing a predetermined pattern as recited in claim 10 wherein:
    the predetermined pattern is a Bragg grating; and
    said light pattern production step includes directing coherent light through the core material from opposite ends thereof, said coherent light producing an interference pattern, said interference pattern producing a Bragg grating throughout the central light transmissive core.

12. A method for establishing a predetermined pattern as recited in claim 10 wherein:
    the predetermined pattern is a Bragg grating; and
    said light pattern production step includes directing coherent light through the cladding material from opposite ends thereof, said coherent light pattern producing an interference pattern, said interference pattern producing thereby a Bragg grating in the central light transmissive core adjacent the reflective cladding.

13. A method for establishing a predetermined pattern as recited in claim 10 wherein said light pattern production step includes directing split light beams externally of the waveguide and generally transversely to the length of the optical waveguide over a portion of the length thereof to produce an interference pattern in portions of the central light transmissive core whereby the interference pattern photobleaches the coextensive irradiated portions of the core.

14. A method for establishing a predetermined pattern as recited in claim 13 wherein:
    the predetermined pattern is a Bragg grating; and
    said light pattern production step additionally includes controlling the light in the split beams thereby to control the interference pattern and the form of the Bragg grating in the central light transmissive core.

15. A method for establishing a predetermined pattern as recited in claim 10 wherein said light pattern production step includes directing coherent light through a mask, said mask having transparent portions and blocking portions, said transparent portions allowing passage of said coherent light and said blocking portions not allowing passage of said coherent light, said transparent portions corresponding to the predetermined pattern.

16. A method for establishing a predetermined pattern as recited in claim 9 wherein the refractive cladding material contains the constituent material and wherein said light pattern production step produces a predetermined pattern in the refractive cladding of the optical waveguide.

17. A method for establishing a predetermined pattern as recited in claim 16 wherein:
    the predetermined pattern is a Bragg grating; and
    said light pattern production step includes directing coherent light through the material in the refractive cladding from opposite ends thereof, said light pattern production step producing an interference pattern, said interference pattern producing a Bragg grating in the refractive cladding.

18. A method for establishing a predetermined pattern as recited in claim 16 wherein:

the predetermined pattern is a Bragg grating; and said light pattern production step includes directing coherent light through the core material from opposite ends thereof, said coherent light producing an interference pattern, said interference pattern producing a Bragg grating in the reflective cladding adjacent the central light transmissive core.

19. A method for establishing a predetermined pattern as recited in claim 16 wherein said light pattern production step includes directing split light beams externally of the waveguide and generally transversely to the length of the optical waveguide over a portion of the length thereof thereby to produce an interference pattern in the refractive cladding whereby the interference pattern photobleaches the coextensive irradiated portions of the refractive cladding.

20. A method for establishing a predetermined pattern as recited in claim 19 wherein:

the predetermined pattern is a Bragg grating; and said light pattern production step additionally includes controlling the light in the split beams thereby to control the interference pattern and the form of the Bragg grating in the refractive cladding.

21. A method for establishing a predetermined pattern as recited in claim 16 wherein said light pattern production step includes directing coherent light through a mask, said mask having transparent portions and blocking portions, said transparent portions allowing passage of said coherent light and said blocking portions not allowing passage of said coherent light, said transparent portions corresponding to the predetermined pattern.

22. Apparatus for establishing a predetermined pattern grating in an optical waveguide having a given light transmissivity partially dependent upon the presence of a radiation sensitive constituent in the optical waveguide and having an indeterminate length, said apparatus comprising:

a nuclear radiation source for generating a stream of radiation over a selected region of the optical waveguide to effect a change in the constituent and produce a predetermined change in the light transmissivity of the optical waveguide therein;

fixture means for positioning the optical waveguide proximate said nuclear radiation source to position the selected regions for receiving the nuclear radiation; and light source means for producing in a selected portion of the optical waveguide a light pattern that photobleaches the predetermined pattern in the optical waveguide wherever the selected region and portion are coextensive.

23. Apparatus as recited in claim 22 wherein said light source means includes light transmitting means for counter-propagating light through the optical waveguide thereby to generate the light pattern, the light pattern being an interference pattern.

24. Apparatus as recited in claim 23 wherein the optical waveguide includes a light transmissive central core and a surrounding refractive cladding and said light transmitting means includes means for directing light to the light transmissive core.

25. Apparatus as recited in claim 23 wherein the optical waveguide includes a light transmissive central core and a surrounding refractive cladding and said light transmitting means includes means for directing light to the refractive cladding.

26. Apparatus as recited in claim 22 wherein said light source means includes a light source and first optical means for splitting light from the source into a pair of beams and second optical means for recombining the pair of beams to form the light pattern, the light pattern being an interference pattern.

27. Apparatus as recited in claim 22 wherein said light source means includes masking means for limiting the application of the light pattern to a selected region of the optical waveguide.

28. Apparatus as recited in claim 22 wherein said radiation source includes means for controlling distribution of the radiation therefrom.

29. Apparatus as recited in claim 28 wherein said controlling means includes radiation masking means intermediate said radiation source and said fixture means thereby to limit the distribution of the radiation.

* * * * *